US010862944B1

(12) United States Patent
Hegar et al.

(10) Patent No.: US 10,862,944 B1
(45) Date of Patent: Dec. 8, 2020

(54) REAL-TIME VIDEO STREAMING WITH LATENCY CONTROL

(71) Applicant: Amazon Technologies, Inc., Seattle, WA (US)

(72) Inventors: Ryan Paul Hegar, Happy Valley, OR (US); Trevor Wells, Washougal, WA (US); Kevin Moore, Portland, OR (US); Brian Lewis, Portland, OR (US); David Scott Montgomery, Portland, OR (US)

(73) Assignee: Amazon Technologies, Inc., Seattle, WA (US)

( * ) Notice: Subject to any disclaimer, the term of this patent is extended or adjusted under 35 U.S.C. 154(b) by 606 days.

(21) Appl. No.: 15/632,263

(22) Filed: Jun. 23, 2017

(51) Int. Cl.
| | |
|---|---|
| H04L 29/06 | (2006.01) |
| H04L 12/841 | (2013.01) |
| H04N 19/46 | (2014.01) |
| H04N 5/268 | (2006.01) |
| H04N 21/43 | (2011.01) |
| H04N 19/40 | (2014.01) |
| H04N 21/433 | (2011.01) |
| H04N 21/442 | (2011.01) |
| H04N 19/895 | (2014.01) |
| H04N 5/44 | (2011.01) |

(52) U.S. Cl.
CPC .......... H04L 65/608 (2013.01); H04L 47/283 (2013.01); H04L 65/607 (2013.01); H04L 65/80 (2013.01); H04N 19/46 (2014.11); H04L 65/605 (2013.01); H04N 5/268 (2013.01); H04N 5/44 (2013.01); H04N 19/40 (2014.11); H04N 19/895 (2014.11); H04N 21/4302 (2013.01); H04N 21/4331 (2013.01); H04N 21/44209 (2013.01)

(58) Field of Classification Search
CPC ........... H04N 21/4302; H04N 21/4331; H04N 21/44209; H04N 5/44; H04N 19/40; H04N 19/895; H04N 5/268; H04L 65/605; H04L 65/607
See application file for complete search history.

(56) References Cited

U.S. PATENT DOCUMENTS

| | | | |
|---|---|---|---|
| 9,191,413 B2 | 11/2015 | Obaidi | |
| 9,398,091 B2 | 7/2016 | Williams et al. | |
| 9,445,147 B2 | 9/2016 | Winters | |
| 9,479,720 B1* | 10/2016 | Hegar | ............... H04N 21/4302 |
| 9,489,980 B2 | 11/2016 | Takabayashi et al. | |
| 9,571,901 B2 | 2/2017 | Thornburg et al. | |
| 9,609,373 B2 | 3/2017 | Rango et al. | |

(Continued)

*Primary Examiner* — Philip J Chea
*Assistant Examiner* — Mohammed Ahmed
(74) *Attorney, Agent, or Firm* — Robert C. Kowert; Kowert, Hood, Munyon, Rankin & Goetzel, P.C.

(57) ABSTRACT

Methods, systems, and computer-readable media for real-time video streaming with latency control are disclosed. Using a media streaming system, a current frame of a video input is acquired from an input pipeline. The current frame is associated with a timestamp. A mapped timestamp associated with the current frame is determined. The mapped timestamp represents the timestamp mapped to a clock associated with the media streaming system. Based at least in part on a comparison between the mapped timestamp and a deadline for frame output, the current frame is either transmitted to an output pipeline according to the deadline, held for evaluation against one or more subsequent deadlines, or discarded.

20 Claims, 7 Drawing Sheets

(56) References Cited

U.S. PATENT DOCUMENTS 9,674,568 B2  6/2017  Du et al.
2008/0095198 A1* 4/2008  Wager .................... H04L 47/56
                                              370/519

* cited by examiner

REAL-TIME VIDEO STREAMING WITH LATENCY CONTROL

BACKGROUND

Internet-based video streaming is increasingly the choice of viewers who seek convenient access to video outside of conventional video distribution channels (including over-the-air broadcasts, cable TV, satellite TV, and prerecorded physical media). Using streaming technologies, viewers may access channels of live video as well as prerecorded video from libraries of video assets that are accessible over an Internet connection. In some cases, streaming video is viewable on a wide range of devices, including desktop computers and laptop computers, tablets, smartphones, wearable computers, and specialized devices such as smart televisions. The flexibility and convenience of streaming video are responsible in part for its widespread adoption.

The distribution and delivery pipeline for streaming video is typically a complicated one. A video asset or live stream may first be acquired, e.g., from a broadcaster. The video may then be processed and transformed in any of several ways (potentially including compression, encryption, and other forms of encoding) for eventual distribution to viewers. A particular video asset or live stream may be compressed at a particular bitrate. A hierarchy of servers over a wide geographical area may be used to deliver the video to many viewers in an efficient manner. A viewer may then attempt to play the video on a viewing device.

Figure 1:
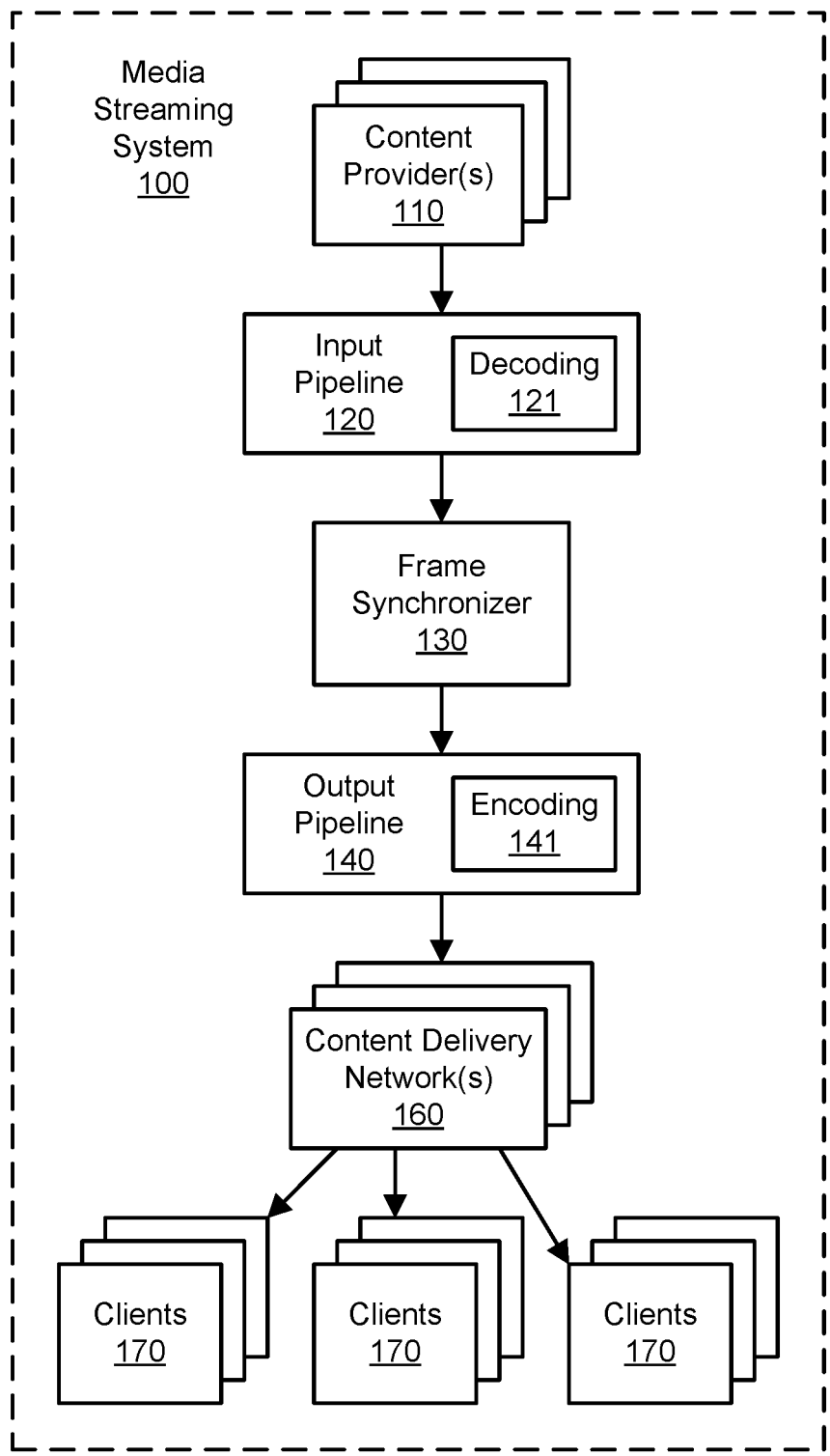
FIG. 1 illustrates an example system environment for real-time video streaming with latency control, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for real-time video streaming with latency control are described. Using the techniques described herein, a media streaming system may be implemented as part of a delivery pipeline for streaming media, such as streaming video combined with audio, text, and/or other types of data. Between an input pipeline and an output pipeline in the media streaming system, a frame synchronizer may control the latency of frames by passing frames at regular intervals based (at least in part) on their internal timestamps and not necessarily on their time of arrival. The timestamps of frames may be mapped to a system clock of the frame synchronizer in order to compare the timestamps to deadlines for frame output within the same system clock domain. In one embodiment, the timestamps of frames may include presentation timestamps that are already associated with individual frames before the acquisition of the frames by the frame synchronizer. Frames may be passed to the output pipeline based on comparisons of the mapped timestamps to regular deadlines for frame output. If the current frame's timestamp indicates that the frame is outdated relative to the deadline to output the next frame, then the frame may be discarded. Early-arriving frames (relative to the current deadline) may not be transmitted right away but may instead be held for evaluation relative to subsequent deadlines. If no frame is ready when a deadline for frame output is reached, and if the current frame's timestamp indicates that it the frame is early relative to the deadline, then a fill frame may be transmitted instead. A fill frame may represent a repeated frame, a blank frame, or a frame displaying a user-supplied slate image. When the current frame or a fill frame is passed to the output pipeline, the deadline for frame output may be updated accordingly. If the output is paced according to the system clock, then the deadline may be updated by the duration of the current frame. If the output is paced according to the frame rate of the video input, then the deadline may be updated by the difference in mapped timestamps between the current frame and the previous frame. Using these techniques, the impact of input disruptions on the net duration of live video events may be mitigated. In the case of input switching or input disruptions, buffer underflows and overflows may be avoided to provide output smoothly. Additionally, gaps in the production of media may be limited in duration.

FIG. 1 illustrates an example system environment for real-time video streaming with latency control, according to one embodiment. A media streaming system 100 may implement a media delivery pipeline to stream media, such as digital video or audio or a combination thereof, to client computing devices 170 for further processing and/or playback using those devices. The media may represent live media content (e.g., a live stream associated with a particular channel) or prerecorded media content (e.g., a media asset from a library of streamable media). The pipeline may include an input pipeline 120 and an output pipeline 140.

The pipeline may also include multiple stages; the stages may represent various transformations of the media and/or various distribution paths for the media (e.g., from device to device over the internet). A media stream may comprise a multichannel media stream in which multiple channels of content are packaged together. The multiple channels may typically represent different content, and a recipient may select one of the channels from the multichannel stream (e.g., for viewing). Alternatively, a media stream may comprise a single channel of media.

The client computing devices 170 may be associated with and/or operated by one or more clients of the media streaming system 100; as used herein, the terms "client computing device," "client device," and "client" may be used interchangeably. The client computing devices 170 may be coupled to portions of the media streaming system 100 via one or more networks, potentially including the Internet. A client may represent a customer (e.g., an individual or group) of the media streaming system 100. Typically, a user associated with one of the client computing devices 170 may have an account that has privileges to access media content provided by the media streaming system 100. The access may be fee-based or may instead be free to the user (potentially with advertisements in the streaming media or player software). However, some media may also be streamable to users without accounts or other arrangements, e.g., on websites that provide streaming video.

It is contemplated that the media delivery pipeline implemented by the media streaming system 100 may include various combinations of pipelines, stages, or other components, including the particular combination illustrated in FIG. 1 for purposes of example. In one embodiment, the media streaming system 100 may use these various pipelines, stages, or other components to implement operations such as acquisition, frame synchronization, encoding, packaging, and distribution of streaming media. In one embodiment, as shown in FIG. 1, the media streaming system 100 may implement an input pipeline 120 and an output pipeline 140. The input pipeline 120 may implement operations such as acquisition, demultiplexing (demuxing), and/or decoding 121 of media. At the acquisition stage, a signal representing the media may be acquired from one or more content providers 110, e.g., broadcasters. The signal may be acquired by the media streaming system 100 using any of several suitable transport mechanisms, including a serial digital interface (SDI), a camera feed, a microphone feed, an internet protocol (IP) connection, an asynchronous serial interface (ASI) connection, and so on. As acquired, the media may include components such as video, audio, captions, and other metadata, and demultiplexing may partition the media into those constituent elements. Demultiplexing may also include partitioning a multichannel stream into individual channels. Additionally, the input pipeline 120 may perform decoding 121 of the video and/or audio components of the acquired media. The decoding 121 may transform the video and/or audio from one form to another, e.g., into a form that is usable by downstream components in the output pipeline 140.

In between the input pipeline 120 and the output pipeline 140, the frame synchronizer 130 may control the latency of frames by passing frames at regular intervals. Frames may be passed to the output pipeline 140 or discarded based (at least in part) on their internal timestamps and not necessarily on their time of arrival at the input pipeline 120 or frame synchronizer 130. Frames may be passed to the output pipeline 140 according to deadlines for frame output. The deadlines may also be referred to as send times, and in one embodiment, frames may be passed only at (or near) the send times and not in between the send times. Using the frame synchronizer 130, the timestamps of frames may be compared to the deadlines for frame output within the domain of a system clock associated with the frame synchronizer. For example, if a frame's timestamp indicates that the frame has arrived late relative to the deadline to output the next frame, then the frame may be discarded. The frame synchronizer 130 may also transmit fill frames, e.g., if no frame is ready when a deadline is reached (e.g., if timestamp(s) indicates that frame(s) have arrived early relative to the deadline). A fill frame may represent a repeated frame, a blank frame, or a frame displaying a user-supplied slate image. When the current frame or a fill frame is passed to the output pipeline 140, the deadline for frame output may be updated accordingly. Using the frame synchronizer 130 to pace output and insert fill frames if needed, the impact of input disruptions on the net duration of live video events may be mitigated. In the case of input switching or input disruptions, use of the frame synchronizer 130 may prevent buffer underflows and overflows from occurring such that output may be produced smoothly. Additionally, gaps in the production of media may be limited in duration by use of the frame synchronizer 130 to pace output and insert fill frames. Further details of the frame synchronizer 130 are described below with respect to FIG. 2, FIG. 4, FIG. 5, and FIG. 6.

The output pipeline 140 may implement operations such as encoding 141, multiplexing (muxing), deinterlacing, frame rate conversion, application of graphics, scaling, watermarking, caption burn-in, and/or packaging of media. At the encoding stage 141, the media may be transformed into a particular video or audio format, e.g., using a particular codec. The encoding stage 141 may be implemented by a plurality of components, referred to herein as encoders, that may operate in parallel. The encoding 141 may also process audio and video separately. The encoders may differ in terms of the encoding tasks they perform. The encoding stage 141 may include compression, or a separate compression stage may be used in the pipeline. Additionally, at the encoding stage 141, the media may be divided into segments or chunks of a fixed or variable size. For example, the media may be divided into segments of approximately ten seconds in length for delivery via HTTP over TCP/IP.

Downstream from the encoding stage 141, the video outputs may be processed further and distributed to one or more clients 170. At a packaging stage, potentially within the output pipeline 141, the media may be packaged and multiplexed (or "muxed") for playback on particular playback software (referred to herein as a "player") and/or a particular type of client device (e.g., a particular category of smartphone). Multiplexing may include combining different components such as video, audio, captions, and metadata into a single data file or stream. In one embodiment, additional stages or sub-stages of the pipeline may perform additional transformations of the media, such as encryption performed at an encryption stage, scaling performed at a scaling stage, advertisement insertion performed at an advertisement insertion stage, and/or other types of image processing (e.g., color transformation) performed at an image processing stage. Alternatively, one of the additional transformations may be performed as a sub-stage of another stage such as the encoding stage 141. In some embodiments, the output pipeline 140 may replicate and pass elements to multiple outputs, each with its own encoder, to produce adaptive bitrate outputs.

In one embodiment, the media streaming system 100 may include distribution components such as one or more origin servers and a plurality of content delivery network (CDN) servers 160. The origin server(s) may act as distribution points to the CDN servers. The CDN servers may be located closer to clients in terms of geography and/or network latency in order to provide efficient distribution of the media. A single origin server may provide a media stream to many CDN servers, and each CDN server may then respond to requests for media from many client devices. In some cases, such as for prerecorded media, the origin server may persistently store the media (or segments thereof) for an indefinite period of time, while the CDN servers may cache segments of the media for a more limited period of time. If a client requests particular content that is not available in the cache at a CDN server, then the CDN server may request the content from the origin server and then deliver the content to the requesting client. Media may be sent from the origin server to one or more CDN servers. If other stages such as acquisition, encoding, and/or packaging are performed at the origin server, then the origin stage may include those stages or include corresponding sub-stages. However, it is also contemplated that the origin server stage may represent a distinct stage relative to the acquisition stage, encoding stage, and/or packaging stage. At the CDN stage 160, the media may be sent from CDN servers to client devices 170, e.g., as requested by the client devices. In one embodiment, the stages may also include a playback stage that represents attempted playback by a player (e.g., implemented in player software) on a client device 170.

In some embodiments, components of the media streaming system 100 such as servers, storage resources, and network resources may be implemented using resources of a provider network. The provider network may be set up by an entity such as a company or a public sector organization to provide one or more services (such as various types of cloud-based computing or storage) accessible via the Internet and/or other networks to clients. The provider network may include numerous data centers hosting various resource pools, such as collections of physical and/or virtualized computer servers, storage devices, networking equipment and the like (e.g., implemented using the example computing system 3000 described below with regard to FIG. 7), needed to implement and distribute the infrastructure and services offered by the provider network. In some embodiments, the provider network may provide computing resources and services, such as services associated with the media streaming system 100; storage services, such as a block-based storage service, key-value based data stores, or various types of database systems; and/or any other type of network-based services. Clients may access these various services offered by provider network 100 via one or more networks, potentially including the Internet. Likewise, network-based services may themselves communicate and/or make use of one another to provide different services. For example, computing resources offered in units called "instances," such as virtual or physical compute instances or storage instances, may make use of particular data volumes, providing virtual block storage for the compute instances.

The provider network may implement or provide a multi-tenant environment such that multiple clients (e.g., content providers 110 and/or clients 170) may access or use a particular resource or service in a substantially simultaneous manner. Functionality of all or part of the media streaming system 100, such as the frame synchronizer 130, may be offered to multiple clients (in a substantially simultaneous manner) in such a multi-tenant provider network, such that the same computational and storage resources associated with the media streaming system may be used on behalf of different clients over the same window of time. The different clients may represent different individuals and/or different organizations that may pay the provider network for access to one or more services and/or resources. The provider network may include a fleet of computing devices, also referred to herein as servers, hosts, or instances, which are configured to execute software on behalf of clients of the provider network. In one embodiment, a fleet of servers may grow or shrink as individual servers are provisioned or deprovisioned using resources of the provider network. In one embodiment, the fleet of servers may grow or shrink as individual servers are added to or removed from a dedicated fleet by an administrator.

The content providers 110 may represent individuals or entities who provide streaming media content to the media streaming system 100 for potential delivery to the clients 170. The content providers 110 as illustrated in FIG. 1 may correspond to computing devices that are connected to the media streaming system 100 over one or more networks, potentially including the Internet. The computing devices associated with the content providers 110 may encompass any type of hardware and software that are configurable to submit requests to the media streaming system 100 (e.g., implemented using the example computing system 3000 described below with regard to FIG. 7). Similarly, the computing devices associated with the clients 170 may encompass any type of hardware and software that are configurable to consume streaming media provided by the media streaming system 100 (e.g., implemented using the example computing system 3000 described below with regard to FIG. 7). For example, a client computing device may include a dedicated media player, a suitable version of a web browser, and/or a plug-in module or other type of code module configured to execute as an extension to or within an execution environment provided by a web browser or other form of client software. In some embodiments, such a client application may include sufficient protocol support (e.g., for a suitable version of Hypertext Transfer Protocol [HTTP]) for generating and processing network-based service requests.

Content providers 110 and/or client computing devices 170 may convey network-based requests to the media streaming system 100 via one or more external networks. In various embodiments, the external network(s) may encompass any suitable combination of networking hardware and protocols necessary to establish network-based communications between computing devices and the media streaming system 100. For example, the network(s) may generally encompass the various telecommunications networks and service providers that collectively implement the Internet. The network(s) may also include private networks such as local area networks (LANs) or wide area networks (WANs) as well as public or private wireless networks. For example, both a given computing device and the media streaming system 100 may be respectively provisioned within enterprises having their own internal networks. In such an embodiment, the network(s) may include the hardware (e.g., modems, routers, switches, load balancers, proxy servers, etc.) and software (e.g., protocol stacks, accounting software, firewall/security software, etc.) necessary to establish a networking link between the given computing device and the Internet as well as between the Internet and the media streaming system 100. It is noted that in some embodiments, computing devices for content providers 110 and/or clients 170 may communicate with the media streaming system 100 using a private network in addition to or instead of the public Internet.

Figure 7:
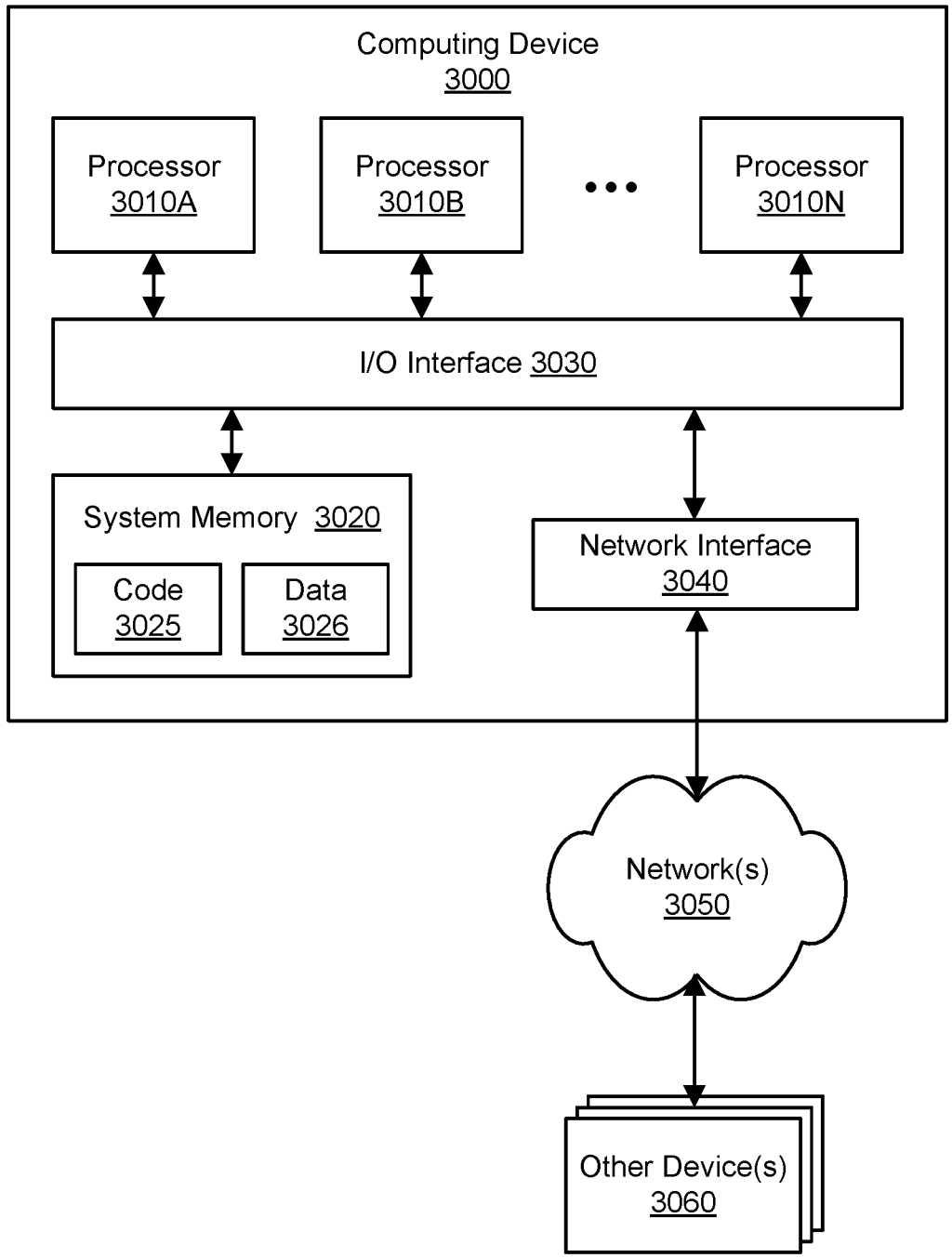
FIG. 7 illustrates an example computing device that may be used in some embodiments.

The media streaming system 100 may include a plurality of computing devices, any of which may be implemented by the example computing device 3000 illustrated in FIG. 7. In various embodiments, portions of the described functionality of the media streaming system 100 may be provided by the same computing device or by any suitable number of different computing devices. If any of the components of the media streaming system 100 are implemented using different computing devices, then the components and their respective computing devices may be communicatively coupled, e.g., via a network. Each of the illustrated components (such as the input pipeline 120, frame synchronizer 130, and output pipeline 140) may represent any combination of software and hardware usable to perform their respective functions. Multiple computing devices may typically be used to implement the multi-stage pipeline. In some circumstances, more than one stage may be performed by the same computing device.

It is contemplated that the media streaming system 100 may include additional components not shown, fewer components than shown, or different combinations, configurations, or quantities of the components shown. For example, although various components such as the input pipeline 120, frame synchronizer 130, and output pipeline 140 are shown for purposes of example and illustration, it is contemplated that different quantities and configurations of components may be used. Aspects of the functionality described herein may be performed, at least in part, by components outside of the media streaming system 100. Additionally, it is contemplated that some of the illustrated stages may include redundant components that collectively provide the functionality of a particular stage. The redundancy of components may permit the pipeline to be rerouted to bypass a problematic component in a particular stage. In one embodiment, the media streaming system 100 may be divided into multiple regions representing different zones within a provider network whose resources are used to implement the media streaming system 100. The different regions may represent geographical divisions of underlying components, including different nations, states, political subdivisions, continents, arbitrary zones, or data centers. Each of the regions may implement a media delivery pipeline with multiple stages. Within each region, a particular stage may be implemented with redundancy.

Figure 2:
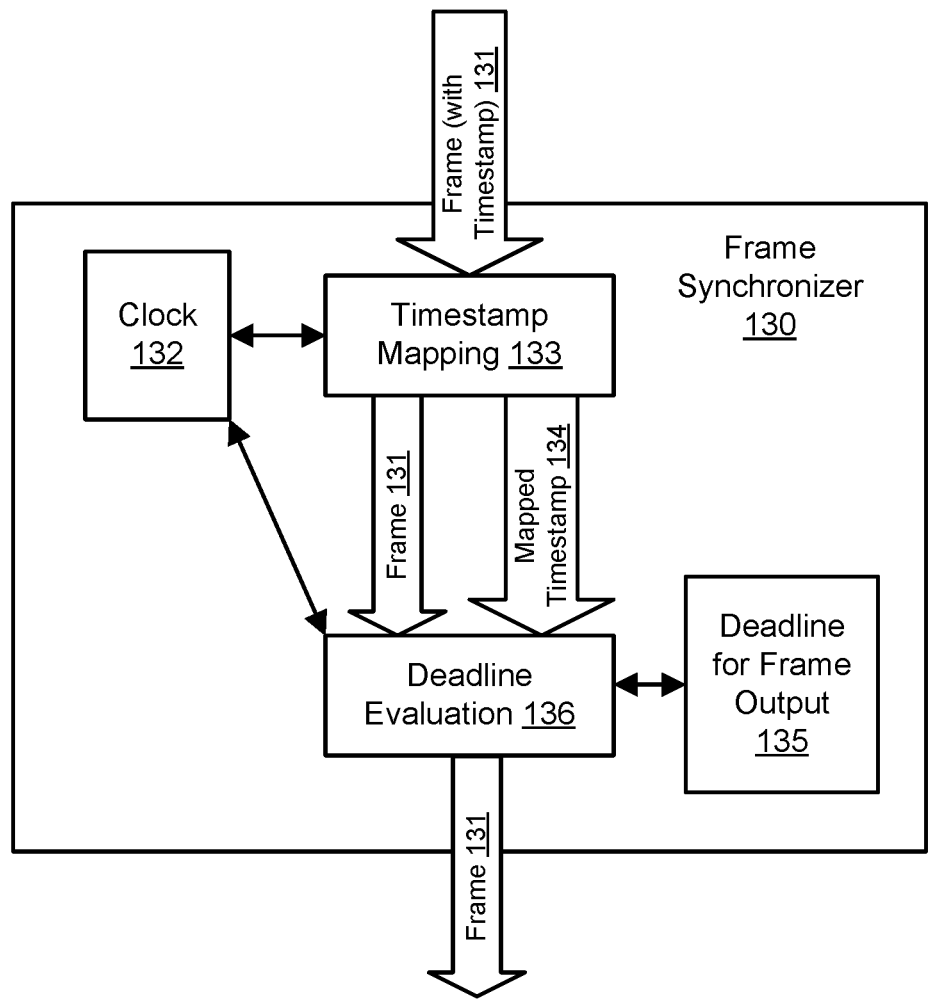
FIG. 2 illustrates further aspects of the example system environment for real-time video streaming with latency control, including a frame synchronizer that paces frame output according to deadlines, according to one embodiment.

FIG. 2 illustrates further aspects of the example system environment for real-time video streaming with latency control, including a frame synchronizer that paces frame output according to deadlines, according to one embodiment. As discussed above, in between the input pipeline 120 and the output pipeline 140, the frame synchronizer 130 may control the latency of frames by passing frames at regular intervals. As shown in the example of FIG. 2, a particular frame 131 of media (e.g., a video input) may be received by the frame synchronizer 130 from the output pipeline 120. In some circumstances, such as with UDP (User Datagram Protocol) transport streams, the frame 131 may be received in a burst or batch along with a set of other frames of the same video input. In such circumstances, the frames may sometimes be received out of order, e.g., in an order that contradicts the order implied by internal timestamps or that otherwise may not reflect the intended order. In some circumstances, such as with SDI (Serial Digital Interface) transport streams, the frames of the video input (including the example frame 131) may be received individually, e.g., on a regular or periodic basis.

Although the video input may represent a prerecorded media asset or a live media stream, the frame synchronizer 130 may be particularly useful for live media streams. The frame 131 may include an internal timestamp. The timestamp may represent a presentation timestamp (PTS) or decode timestamp (DTS), and the video input may include such timestamps per frame. The timestamp may be generated and associated with the frame prior to receipt of the frame by the frame synchronizer. Accordingly, the timestamp may not necessarily reflect the time of receipt by the frame synchronizer. The timestamp may indicate a particular time or position on a timeline within the context of the video input rather than a time of day. For example, the timestamp may the time the frame should be decoded or displayed relative to a program clock reference that is also described by the transport stream.

The timestamps of frames of the video input may be used to pass frames to the output pipeline 140 on a periodic basis to provide smooth and regular output to downstream components. In one embodiment, a timestamp mapping component 133 of the frame synchronizer 130 may map timestamps into the domain of a system clock 132 associated with the frame synchronizer. The timestamps may be mapped to the system clock domain so that proper comparisons may be made between the timestamps and regular deadlines for frame output. The clock 132 may represent an internal clock of a computing device that implements the frame synchronizer 130. The clock 132 may be locked to an external reference clock (e.g., a clock outside the frame synchronizer 130 or media streaming system 100) via protocols such as Network Time Protocol (NTP) or Precision Time Protocol (PTP). The output of the timestamp mapping 133 may be referred to as a mapped timestamp 134.

In one embodiment, for SDI inputs with regular, ordered, and uncompressed frames, the timestamp mapping 133 may capture the current time on the system clock 132 whenever a frame (such as frame 131) is received at the frame synchronizer 130. That current time may represent the mapped timestamp for the frame 131, e.g., the mapping of the frame's timestamp into the system clock domain. In one embodiment, for UDP inputs that may be received in bursts and out of order, the video input may include one or more program clock reference (PCR) timestamps. The PCR timestamps may represent the internal clock of the video input. In one embodiment, the timestamp mapping 133 may take a measurement of the system clock 132 whenever a PCR timestamp is detected in the video input. The measurement may be taken with low jitter to provide an accurate mapping into the system clock domain. The timestamp mapping may then determine a difference between the system clock 132 and the PCR timestamp, and that difference may represent a mapping of the transport stream's clock domain into the system clock domain of the frame synchronizer 130. For a given frame such as frame 131, the PCR-derived difference may be used to convert the timestamp of the frame into a mapped timestamp 134 expressed in the system clock domain.

Frames may be passed to the output pipeline 140 according to periodic deadlines for frame output. The deadlines may also be referred to as send times, and in one embodiment, frames may be passed only at (or near) the send times and not in between the send times in order to provide smooth and regular output. The frame synchronizer 130 may record the UTC time of the first frame in a video input. Between sending frames to the output pipeline 140, the frame synchronizer 130 may sleep for approximately the duration of one frame before waking to schedule the next frame output. The particular frame 131 may be passed to the output pipeline 140 or discarded based (at least in part) on the mapped timestamp 134 and not necessarily on the frame's time of arrival at the input pipeline 120 or frame synchronizer 130. The frame synchronizer 130 may maintain a deadline 135 for frame output of the next frame. The deadline 135 may be expressed in the system clock domain. The frame synchronizer 130 may include a deadline evaluation component 136 that compares mapped timestamps of frames to deadlines for frame output within the same domain of the system clock 132. In one embodiment, the deadline evaluation 136 may evaluate the mapped timestamps of any available frames when the deadline 135 is approaching. If the deadline evaluation 136 determines that the frame 131 has a mapped timestamp that matches the current deadline 135 or is sufficiently close to the deadline (e.g., within some threshold margin), the frame synchronizer 130 may pass that frame to the output pipeline at (or near) the current deadline 135. The deadline 135 may be updated, e.g., when a frame is passed to the output pipeline 140. If the deadline evaluation 136 determines that any available frame has a mapped timestamp that is sufficiently less than the current deadline 135 (e.g., within some threshold margin), then that frame may be deemed to have arrived late and may be discarded and not passed to the output pipeline. If the deadline evaluation 136 determines that any available frame has a mapped timestamp that is sufficiently greater than the current deadline 135 (e.g., within some threshold margin), then that frame may be deemed to have arrived early and may be held for additional evaluation at future deadlines. Such an early-arriving frame may be maintained in memory associated with the frame synchronizer 130 and may be evaluated relative to one or more subsequent deadlines, e.g., until the frame is deemed due for transmission to the output pipeline 140.

If the deadline evaluation 136 determines that no frames are available with appropriate mapped timestamps when the current deadline 135 arrives, then the frame synchronizer 130 may pass a fill frame. For example, no frames may be available for frame output in the case of an input disruption or a switching between inputs. A fill frame may represent a repeated frame, a blank frame, or a frame displaying a user-supplied slate image. In one embodiment, the contents of the fill frame may vary depending upon the number of consecutive fill frames that have already been passed or the size of the gap in the input. For example, the first few fill frames may represent a copy of a previously passed frame, the next set of fill frames may represent a blank image, and, if the gap is sufficiently large, the final set of fill frames may represent a slate image indicating that the program is unavailable. The contents of the fill frame and the durations of the various types of fill frames may be user-configurable.

When the current frame or a fill frame is passed to the output pipeline 140, the deadline for frame output may be updated accordingly. In various embodiments, the frame output may be paced according to the system clock 132 or according to the frame rate of the video input. If the output is paced according to the system clock, then the deadline may be updated by the duration of the current frame that was passed to the output pipeline. For example, if the video input is intended to be displayed at 25 frames per second (fps), then the deadline may be incremented by 40 ms after a frame is passed. If the video input is arriving faster than the intended frame rate, however, then pacing the output according to the system clock may result in frames accumulating past their deadlines and being discarded. If the output is instead paced according to the frame rate of the video input, then the deadline may be updated by the difference in mapped timestamps between the current frame and the previous frame. For example, if the input encoder is faster than the system clock 132, then the difference in mapped timestamps between two consecutive frames may be 39.9 ms rather than 40.0 ms, and the deadline may be incremented by 39.9 ms rather than 40.0 ms so that fewer or no frames are dropped. As another example, if the input encoder is slower than the system clock 132, then the difference in mapped timestamps between two consecutive frames may be 40.1 ms rather than 40.0 ms, and the deadline may be incremented by 40.1 ms rather than 40.0 ms so that fewer or no fill frames are needed. In one embodiment, the choice between pacing according to the system clock or the input rate may be user-configurable. In one embodiment, by default the output may be paced to the input rate if such a rate is available.

If the frame synchronizer 130 is configured to lock the output rate to the rate of the input (also referred to as the input's recovered clock), and the input is of a file type or input type for which calculation of the mapped timestamp is not accurate (e.g., for HTTP Live Streaming input or Real-Time Messaging Protocol), then the frame synchronizer may also generate output timing based on its local system clock by calculating the duration between frames directly from the input frame rate. Similarly, if the frame synchronizer 130 is configured to lock the output rate to the rate of the input (also referred to as the input's clock), and frame is a fill frame inserted due to underflow, then the frame synchronizer may also generate output timing based on its local system clock by calculating the duration between frames directly from the input frame rate. The frame synchronizer 130 may also generate output timing based on its local system clock if the clock recovery component is unable to lock to the input clock with a reasonable clock skew or if the difference in mapped timestamps between the previous two frames is not within a reasonable range relative to the duration calculated from the input frame rate (e.g., due to a PTS discontinuity, dropped input frames, or other error). In one embodiment, the deadline may be incremented by the frame rate for the current frame if either the previous frame or the current frame was dropped, repeated, or inserted, or if the calculated duration between the two frames is not within a reasonable tolerance of the nominal duration.

Using the frame synchronizer 130 to pace output and insert fill frames if needed, the impact of input disruptions on the net duration of live video events may be mitigated. Input disruptions may occur due to UDP packet loss, SDI input disruption, failed attempts to acquire content from an intermittently unavailable HTTP server, or various other reasons. Some input disruptions may cause a gap in the presentation timestamps between frames such that the duration of the gap indicates the duration of the lost video. Other input disruptions may result in a discontinuity of presentation timestamps due to a splice in the video input such that the gap does not reliably reflect the duration of the video expected during the interval. Yet other input disruptions may have no input loss but rather a significant delay (e.g., several seconds) between receiving frames. In other cases, input may be arriving too fast or too slow relative to the desired frame rate. Use of the frame synchronizer 130 to pace output and insert fill frames may permit quick reactions to input switching or input disruptions such that buffer underflows and overflows can be avoided and output produced smoothly. Additionally, gaps in the production of media may be limited in duration by use of the frame synchronizer 130 to pace output and insert fill frames.

Using the frame synchronizer 130, dedicated input switch buffers for handling input switches may not be needed.

Using the frame synchronizer 130, downstream components that expect regular input may have improved performance. For example, the output pipeline 140 may include a statistical multiplexer (statmux) that splits a stream into multiple streams of variable bitrates, and such a component may perform better by relying on consistent timing of media and complexity data from the encoding stage. As another example, the media streaming system 100 may include MPEG-DASH (Dynamic Adaptive Streaming over HTTP) players, and such players may properly assume that segment or frame counts increase in direct proportion to the current time because the duration of output media using the frame synchronizer 130 is better insulated from input loss and timing.

Using the media streaming system 100, audio may be synchronized with video in a similar manner as implemented using the frame synchronizer 300. In one embodiment, the timestamps of audio may be aligned with the timestamps of video. An audio synchronizer may produce data such that the timestamps of audio output stay a fixed distance behind the timestamps of the video output. In one embodiment, as the frame synchronizer inserts fill frames to mitigate underflow, the audio synchronizer may insert silence to mitigate underflow. The frame synchronizer may communicate events such as gaps on drop frames, discontinuities, and input clipping regions to the audio synchronizer. A caption synchronizer and/or a metadata synchronizer may similarly follow decisions made by the frame synchronizer 130.

Figure 3:
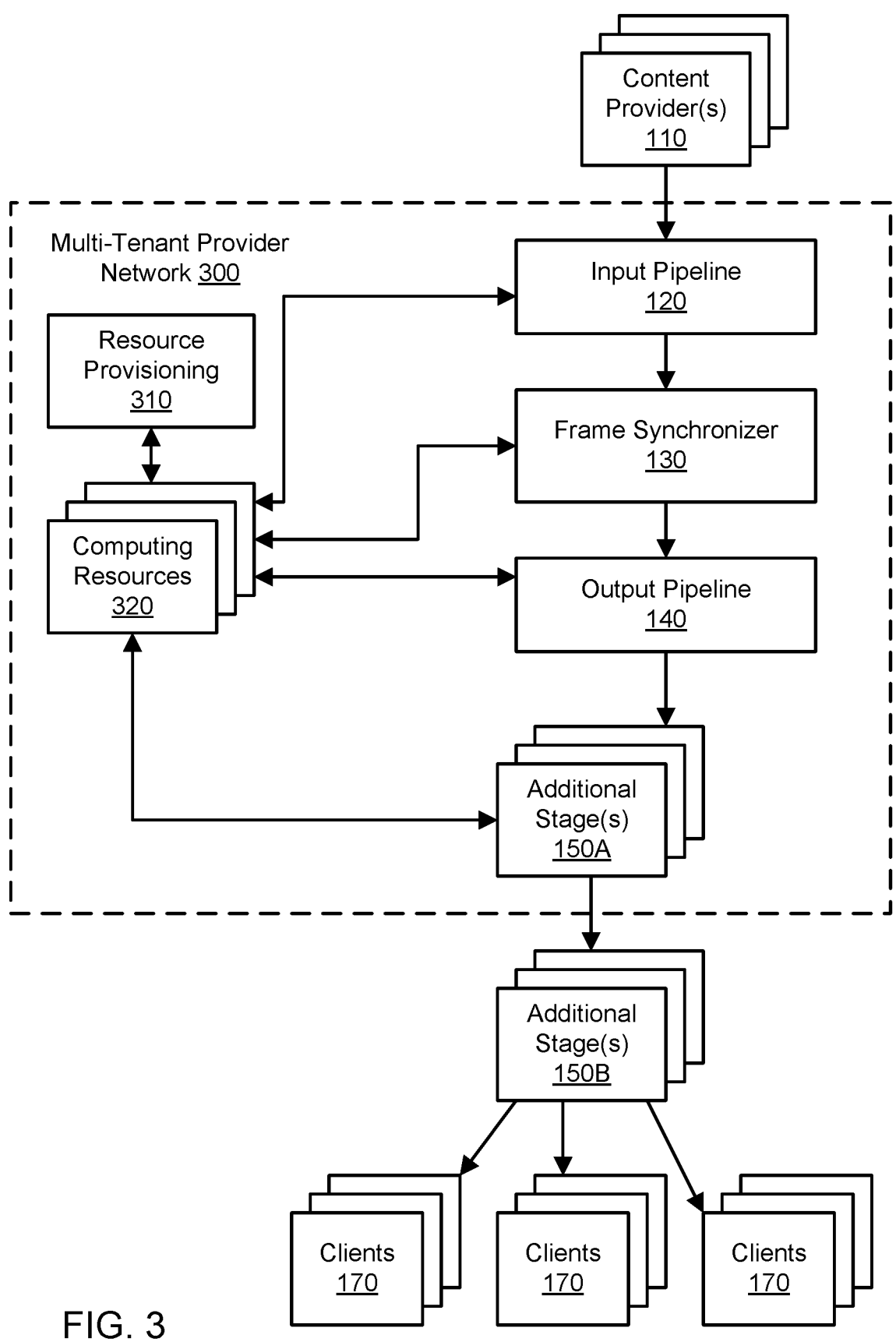
FIG. 3 illustrates further aspects of the example system environment for real-time video streaming with latency control, including the implementation of components using computing resources provisioned from a multi-tenant provider network, according to one embodiment.

FIG. 3 illustrates further aspects of the example system environment for real-time video streaming with latency control, including the implementation of components using computing resources provisioned from a multi-tenant provider network, according to one embodiment. As discussed above with respect to FIG. 1, the media streaming system 100 may be implemented using one or more computing resources, such as virtual compute instances or physical compute instances, that are provisioned from a provider network 300. In one embodiment, different components (including redundant components within a stage) of the media streaming system 100 may be implemented using different compute instances. The provider network 300 may offer multi-tenancy such that computing resources from a pool 320 may be shared by multiple clients of the provider network at any given time. The computing resources 320 may include compute instances, storage instances, database instances, and so on. A resource provisioning functionality 310 in the multi-tenant provider network 300 may provision and deprovision resources in the pool 320 on behalf of clients. A computing resource from the pool 320 may be provisioned by selecting any appropriate type of resource, making it available to a particular client at a particular time, and potentially configuring the resource (e.g., with operating system software for a compute instance) to meet the requirements of the client. The client may then operate the provisioned resource based on the client's agreement with the provider network, e.g., on an hourly basis for a fee. When a resource is deprovisioned and returned to the pool 320 of available resources, another client may then provision and use that resource.

Various components of the media streaming system 100 such as the input pipeline 120, frame synchronizer 130, and output pipeline 140 may be provisioned using resources of the provider network. As shown in the example of FIG. 3, one or more additional pipeline stages 150A may be implemented using the resources of the provider network 300, while one or more other pipeline stages 150B may be implemented outside of the provider network. For example, packagers in a packaging stage may be implemented inside the provider network 300, while origin servers and content delivery network (CDN) servers may be implemented outside the provider network.

Figure 4:
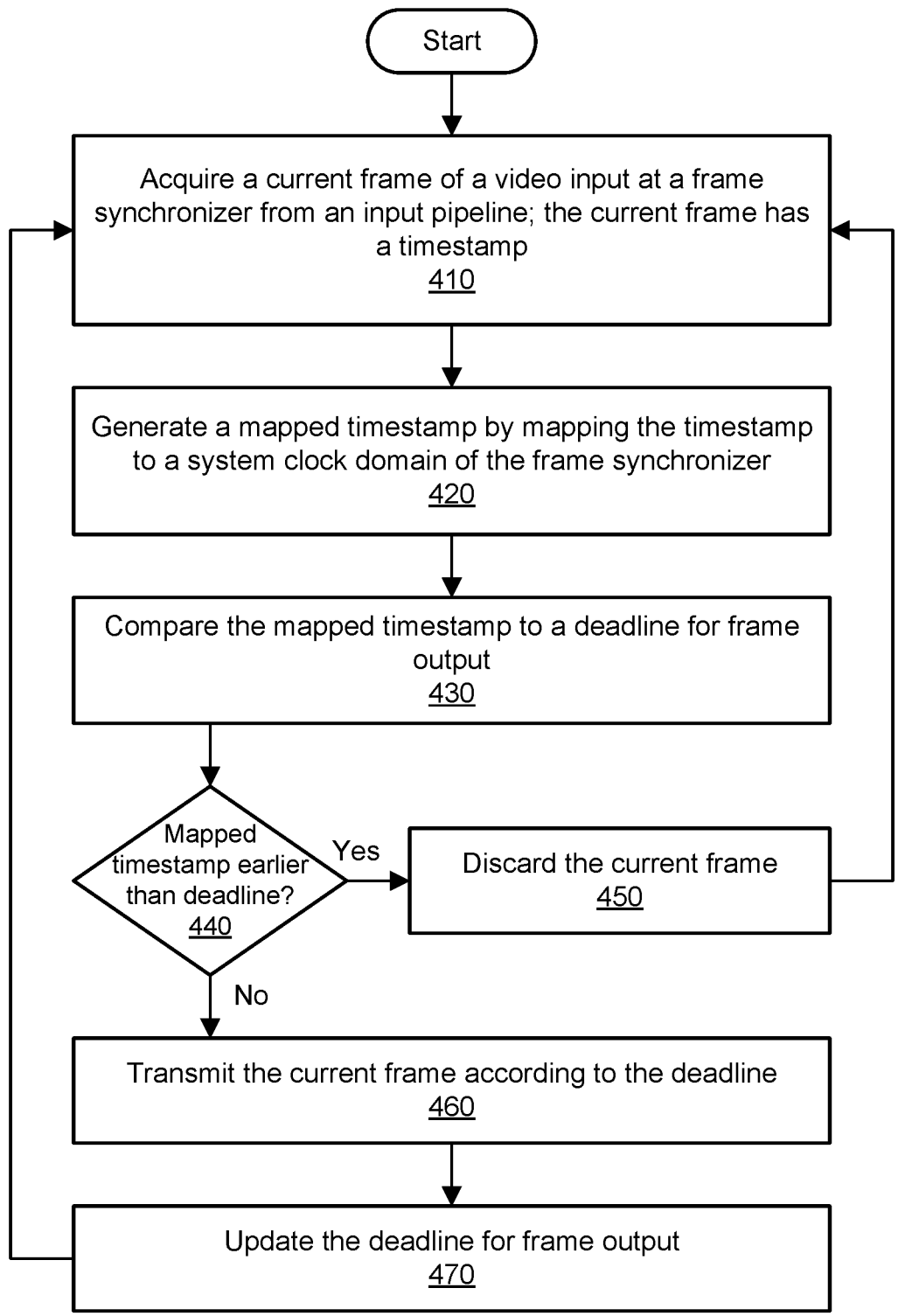
FIG. 4 is a flowchart illustrating a method for real-time video streaming with latency control, according to one embodiment.

FIG. 4 is a flowchart illustrating a method for real-time video streaming with latency control, according to one embodiment. As shown in 410, a current frame of a video input may be acquired. The current frame may be received at a frame synchronizer from an input pipeline of a media streaming system. The term "current" may indicate that the frame is the most recently received frame. In some circumstances, such as with UDP transport streams, the frame may be received in a burst or batch along with a set of other frames of the same video input. In such circumstances, the frames may sometimes be received out of order, e.g., in an order that contradicts the order implied by internal timestamps or that otherwise may not reflect the intended order. In some circumstances, such as with SDI transport streams, the frames of the video input may be received individually, e.g., on a regular or periodic basis. The frame may include a timestamp. The timestamp may represent a presentation timestamp (PTS) or decode timestamp (DTS), and the video input may include such timestamps per frame. The timestamp may be generated and associated with the frame prior to receipt of the frame by the frame synchronizer. Accordingly, the timestamp may not necessarily reflect the time of receipt by the frame synchronizer.

As shown in 420, a mapped timestamp may be generated for the current frame by mapping or translating the timestamp of the frame into the domain of a system clock. The timestamp may be mapped to the system clock domain so that proper comparisons may be made between the timestamp and one or more deadlines for frame output. The system clock may represent an internal clock of a computing device that implements the frame synchronizer. The system clock may be locked to an external reference clock (e.g., a clock outside the frame synchronizer or media streaming system) via protocols such as NTP or PTP. In one embodiment, for SDI inputs with regular, ordered, and uncompressed frames, the timestamp mapping may capture the current time on the system clock when the current frame is received at the frame synchronizer. That current time may represent the mapped timestamp for the frame, e.g., the mapping of the frame's timestamp into the system clock domain. In one embodiment, for UDP inputs that may be received in bursts and out of order, the video input may include one or more program PCR timestamps. The PCR timestamps may represent the internal clock of the video input. In one embodiment, the timestamp mapping may take a measurement of the system clock whenever a PCR timestamp is detected in the video input. The measurement may be taken with low jitter to provide an accurate mapping into the system clock domain. The timestamp mapping may then determine a difference between the system clock and the PCR timestamp, and that difference may represent a mapping of the transport stream's clock domain into the system clock domain of the frame synchronizer. For the current frame, the PCR-derived difference may be used to convert the timestamp of the frame into a mapped timestamp expressed in the system clock domain As shown in 430, the mapped timestamp may be compared to a current deadline for frame output. Deadlines for frame output may occur periodically. The deadlines also be referred to as send times, and in one embodiment, frames may be passed only at (or near) the send times and not in between the send times in order to provide smooth and regular output. The mapped timestamp and the deadline for producing the next frame may both be expressed in the domain of the system clock.

As shown in 440, the method may determine whether the mapped timestamp is later than the current deadline, either in absolute terms or according to some predetermined time threshold. As shown in 450, if the frame's mapped timestamp is earlier than (e.g., less than) the current deadline, then the frame may be deemed late and may be discarded (or dropped) and not passed to the output pipeline. A frame's mapped timestamp may be earlier than the current deadline if the frame is received too late (e.g., due to an unreliable input source) or if the video input is arriving at a sufficiently fast frame rate that frames are accumulating past their send times. As shown in 460, if the frame's mapped timestamp is not earlier than the current deadline, then the current frame may be transmitted to the output pipeline of the media streaming system. The frame may be passed according to the deadline, e.g., at or near the deadline and not between deadlines.

As shown in 470, the deadline for frame output may be updated. In various embodiments, the frame output may be paced according to the system clock or according to the frame rate of the video input. As shown below in the example of FIG. 5, the deadline may be updated in different ways dependent on whether the frame output is paced according to the system clock or according to the frame rate of the video input (e.g., the recovered clock of the input).

Figure 5:
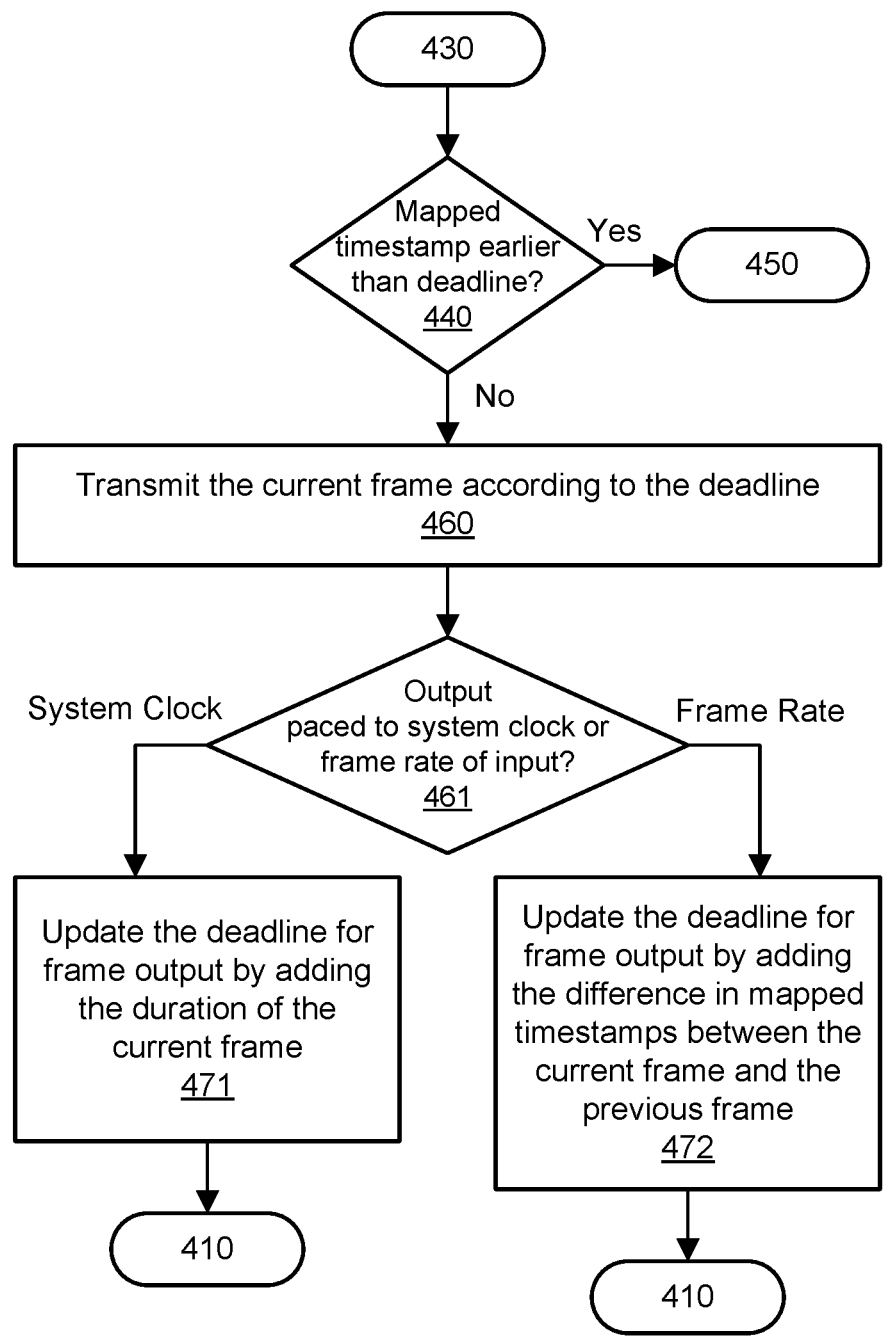
FIG. 5 is a flowchart illustrating further aspects of the method for real-time video streaming with latency control, including pacing frame output based on a system clock of a frame synchronizer or based on a frame rate of the input, according to one embodiment.

FIG. 5 is a flowchart illustrating further aspects of the method for real-time video streaming with latency control, including pacing frame output based on a system clock of a frame synchronizer or based on a frame rate of the input, according to one embodiment. As discussed above, the deadline for frame output may be updated in connection with the sending of a frame to the output pipeline. As shown in 461, the method may determine whether the frame output is paced according to the system clock or according to the frame rate of the video input. In one embodiment, the choice between pacing according to the system clock or the input rate may be user-configurable. In one embodiment, by default the output may be paced to the input rate if such a rate is available.

If the output is paced according to the system clock, then as shown in 471, the deadline may be updated by the duration of the current frame that was passed to the output pipeline. For example, if the video input is intended to be displayed at 25 frames per second (fps), then the deadline may be incremented by 40 ms after a frame is passed. If the video input is arriving faster than the intended frame rate, however, then pacing the output according to the system clock may result in frames accumulating past their deadlines and being discarded.

If the output is instead paced according to the frame rate of the video input, then as shown in 472, the deadline may be updated by the difference in mapped timestamps between the current frame and the previous frame. For example, if the input encoder is faster than the system clock, then the difference in mapped timestamps between two consecutive frames may be 39.9 ms rather than 40.0 ms, and the deadline may be incremented by 39.9 ms rather than 40.0 ms so that fewer or no frames are dropped. As another example, if the input encoder is slower than the system clock 132, then the difference in mapped timestamps between two consecutive frames may be 40.1 ms rather than 40.0 ms, and the deadline may be incremented by 40.1 ms rather than 40.0 ms so that fewer or no fill frames are needed.

Figure 6:
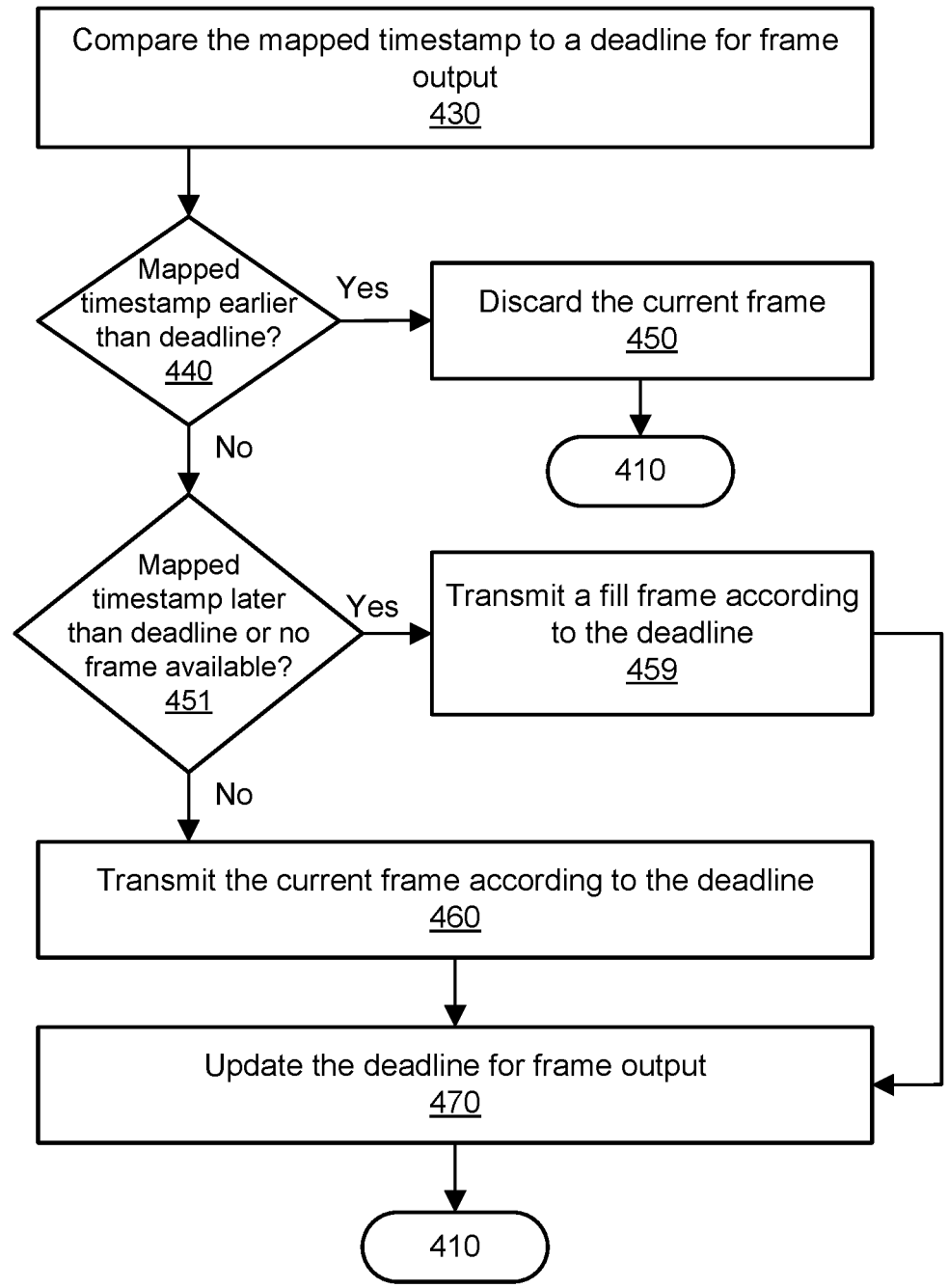
FIG. 6 is a flowchart illustrating further aspects of the method for real-time video streaming with latency control, including transmitting a fill frame if the current frame is premature or not ready, according to one embodiment.

FIG. 6 is a flowchart illustrating further aspects of the method for real-time video streaming with latency control, including transmitting a fill frame if the current frame is premature or not ready, according to one embodiment. As discussed above, a frame may be deemed a late arrival and discarded if its mapped timestamp is sufficiently earlier than the current deadline for frame output. As shown in 451, the method may determine whether the mapped timestamp is later than the current deadline, either in absolute terms or according to some predetermined time threshold. As shown in 451, the method may also determine whether any frame at all is ready for output. No frames may be ready for a period of time in the case of input disruption or input switching. If the mapped timestamp of the current frame is too late (e.g., greater than the current deadline), and if no other frame is ready for output (e.g., due for transmission based on its mapped timestamp in comparison to the deadline), then as shown in 459, a fill frame may be transmitted to the output pipeline instead. A fill frame may represent a repeated frame, a blank frame, or a frame displaying a user-supplied slate image. In one embodiment, the contents of the fill frame may vary depending upon the number of consecutive fill frames that have already been passed or the size of the gap in the input. For example, the first few fill frames may represent a copy of a previously passed frame, the next set of fill frames may represent a blank image, and, if the gap is sufficiently large, the final set of fill frames may represent a slate image indicating that the program is unavailable. As shown again in 470, the deadline for frame output may be updated as discussed above in connection with the passing of a fill frame to the output pipeline.

Illustrative Computer System

In at least some embodiments, a computer system that implements a portion or all of one or more of the technologies described herein may include a computer system that includes or is configured to access one or more computer-readable media. FIG. 7 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more computing devices configured to implement a media streaming system, wherein the media streaming system is associated with a clock, and wherein the media streaming system is configured to:
acquire a current frame of a video input from an input pipeline, wherein the current frame is associated with a timestamp, and wherein the timestamp is generated prior to acquisition from the input pipeline;
determine a mapped timestamp associated with the current frame, wherein the mapped timestamp represents the timestamp mapped to the clock, and wherein the mapped timestamp represents a current time of the clock when the current frame is acquired;

based at least in part on a comparison of the mapped timestamp to a deadline for frame output, transmit the current frame to an output pipeline according to the deadline, hold the current frame for evaluation relative to one or more subsequent deadlines, or discard the current frame; and if the current frame is transmitted to the output pipeline, update the deadline for frame output based at least in part on a duration of the current frame or based at least in part on a difference between the mapped timestamp of the current frame and a mapped timestamp of a previous frame.

2. The system as recited in claim 1, wherein the media streaming system is further configured to:

if an additional frame of the video input is not available for transmission at a subsequent deadline for frame output, transmit a fill frame to the output pipeline according to the subsequent deadline; and update the subsequent deadline for frame output.

3. The system as recited in claim 1, wherein the media streaming system is further configured to:

if a mapped timestamp associated with a next frame of the video input is later than a next deadline for frame output, transmit a fill frame to the output pipeline according to the next deadline; and update the next deadline for frame output.

4. The system as recited in claim 1, wherein the current frame is discarded if the mapped timestamp is earlier than the deadline for frame output, and wherein the current frame is not transmitted to the output pipeline.

5. A computer-implemented method, comprising:

acquiring, by one or more computing devices that implement a media streaming system, a frame of a video input from an input pipeline, wherein the frame is associated with a timestamp;

determining a mapped timestamp associated with the frame, wherein the mapped timestamp represents the timestamp mapped to a clock;

based at least in part on the mapped timestamp and a deadline for frame output, transmitting the frame to an output pipeline according to the deadline, holding the frame for evaluation relative to one or more subsequent deadlines, or discarding the frame; and if the frame is transmitted to the output pipeline, updating the deadline for frame output.

6. The method as recited in claim 5, wherein the deadline for frame output is updated based at least in part on a duration of the frame.

7. The method as recited in claim 5, wherein the deadline for frame output is updated based at least in part on a difference between the mapped timestamp of the frame and a mapped timestamp of a previous frame.

8. The method as recited in claim 5, further comprising:

if no frames of the video input are available for transmission at a next deadline for frame output, transmitting a fill frame to the output pipeline according to the next deadline for frame output.

9. The method as recited in claim 5, further comprising:

if a mapped timestamp associated with a next frame of the video input is later than a next deadline for frame output, transmitting a fill frame to the output pipeline according to the next deadline for frame output.

10. The method as recited in claim 5, wherein the frame is discarded if the mapped timestamp is earlier than the deadline for frame output, and wherein the frame is not transmitted to the output pipeline.

11. The method as recited in claim 5, wherein the output pipeline performs encoding and multiplexing of the video input.

12. The method as recited in claim 5, wherein the mapped timestamp represents a current time of the clock when the frame is acquired.

13. The method as recited in claim 5, further comprising:

determining a program clock reference (PCR) associated with the video input; and determining a difference between the PCR and the clock, wherein the mapped timestamp represents a mapping of the timestamp to the clock based at least in part on the difference between the PCR and the clock.

14. One or more non-transitory, computer-readable storage media, storing program instructions that when executed on or across one or more computing devices cause the one or more computing devices to implement:

acquiring a current frame of a video input from an input pipeline, wherein the current frame is associated with a timestamp, and wherein the timestamp is generated prior to acquisition from the input pipeline;

determining a mapped timestamp associated with the current frame, wherein the mapped timestamp represents the timestamp mapped to a clock associated with a media streaming system; and based at least in part on a comparison of the mapped timestamp to a deadline for frame output, transmitting the current frame to an output pipeline according to the deadline, holding the current frame for evaluation relative to one or more subsequent deadlines, or discarding the current frame; and if the current frame is transmitted to the output pipeline, updating the deadline for frame output.

15. The one or more non-transitory, computer-readable storage media as recited in claim 14, wherein the deadline for frame output is updated based at least in part on a duration of the current frame.

16. The one or more non-transitory, computer-readable storage media as recited in claim 14, wherein the deadline for frame output is updated based at least in part on a difference between the mapped timestamp of the current frame and a mapped timestamp of a previous frame.

17. The one or more non-transitory, computer-readable storage media as recited in claim 14, wherein the program instructions are further executable to implement:

if a next frame of the video input is not available for transmission at a next deadline for frame output, transmitting a fill frame to the output pipeline according to the next deadline for frame output.

18. The one or more non-transitory, computer-readable storage media as recited in claim 14, wherein the program instructions are further executable to implement:

if a mapped timestamp associated with a next frame of the video input is later than a next deadline for frame output, transmitting a fill frame to the output pipeline according to the next deadline for frame output.

19. The one or more non-transitory, computer-readable storage media as recited in claim 14, wherein the current frame is discarded if the mapped timestamp is earlier than the deadline for frame output, and wherein the current frame is not transmitted to the output pipeline.

20. The one or more non-transitory, computer-readable storage media as recited in claim 14, wherein the output pipeline performs encoding and multiplexing of the video input.

* * * * *